United States Patent

[11] 3,566,880

| [72] | Inventor | Glenn E. Riffe<br>East Moline, Ill. |
|---|---|---|
| [21] | Appl. No. | 839,345 |
| [22] | Filed | July 7, 1969 |
| [45] | Patented | Mar. 2, 1971 |
| [73] | Assignee | International Harvester Company<br>Chicago, Ill. |

[54] COMBINE-CLEANING SYSTEM
10 Claims, 4 Drawing Figs.

[52] U.S. Cl. .................................................... 130/27
[51] Int. Cl. ...................................................... A01f 12/48
[50] Field of Search........................................... 130/27.32,
27.8 (F); 209/318; 138/44

[56] References Cited
UNITED STATES PATENTS
2,306,753  12/1942  Ronning ....................... 130/27.32

| 2,849,118 | 8/1958 | Ashton ........................ | 130/27.8F |
| 3,109,433 | 11/1963 | Claas .......................... | 130/27.32 |
| 3,213,857 | 10/1965 | Ashton et al. ................. | 130/27.8F |

FOREIGN PATENTS

| 841,967 | 6/1952 | Germany ..................... | 130/27.32 |

*Primary Examiner*—Antonio F. Guida
*Attorney*—Noel G. Artman

ABSTRACT: A winnowing fan for use on a combine harvester having a vertical chamber spaced from the sidewall of the harvester. A fan mounted in the upper portion of the vertical chamber that functions to draw air into the chamber from both sides and directs it down the chamber where it flows into a plenum box. An even stream of winnowing air is discharged from the plenum box towards the chaffer and sieve of the harvester-cleaning system.

PATENTED MAR 2 1971  3,566,880

INVENTOR
GLENN E. RIFFE

BY
F. David Au Buchon ATT'Y.

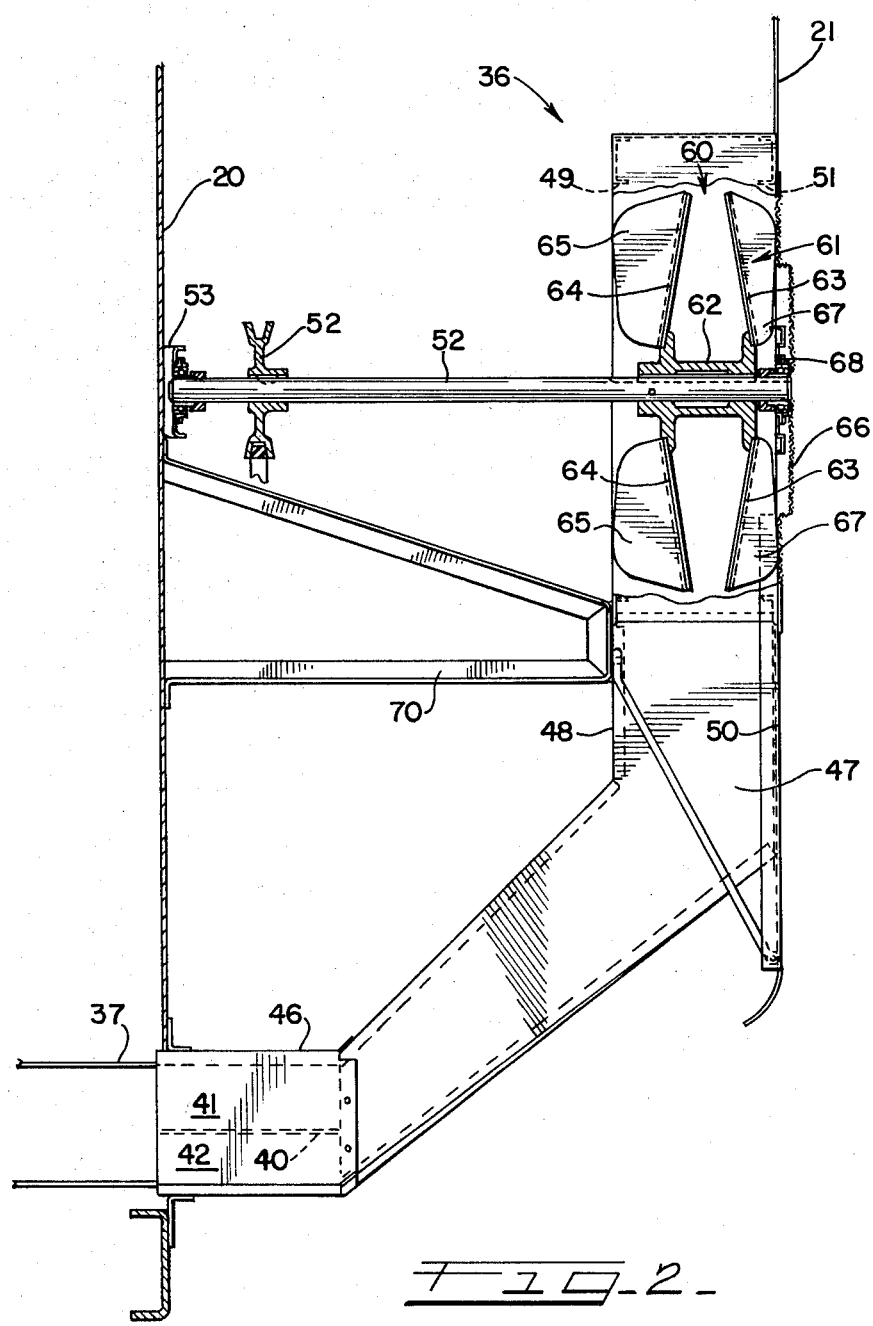

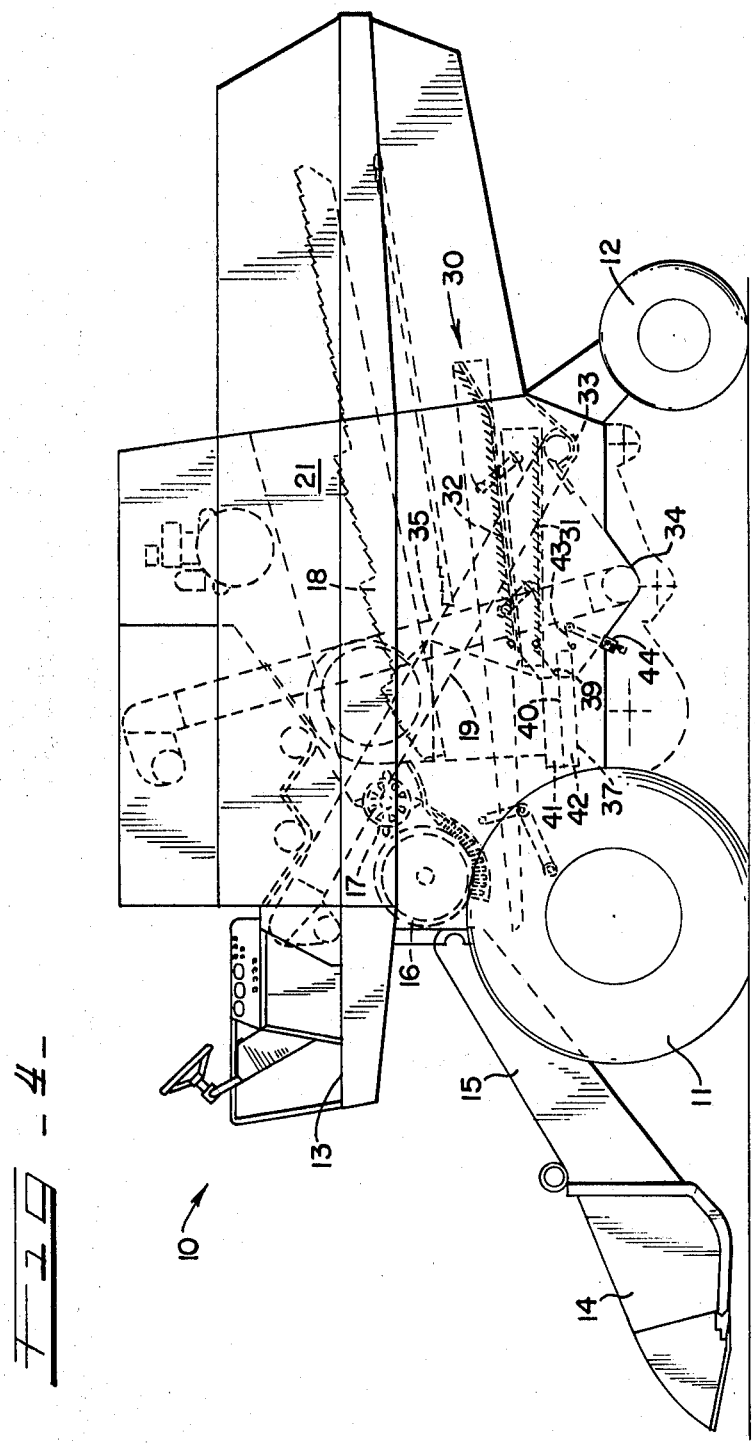

COMBINE-CLEANING SYSTEM

BACKGROUND OF THE INVENTION

1. Field of the Invention

The present invention relates generally to improvements in combine harvesters and the like and more particularly to a new and improved winnowing fan for a combine harvester wherein an even stream of air is provided across the cleaning system.

2. Description of the Prior Art

The conventional winnowing fan for combine harvesters comprises a fan casing mounted on the lowermost part of the machine between the drive and the guide wheels. The fan casing is open on each end and air is drawn into the fan casing through both open ends. The air is then directed rearwardly through a discharge section towards the sieve and chaffer of the cleaning system. Reference may be had to the U.S. Pat. to Rowland-Hill No. 3,401,720 of Sept. 24, 1968 for a showing of the conventional fan of the above type. The trend in combine harvesters is to produce machines of larger and larger capacity. As larger machines are built the capacity of the cleaning system must likewise by increased and both the width and the diameter of the fan casing increase. The conventional fans have an inherent disadvantage in that since the air is drawn in from the ends the discharge stream is uneven having greater volume at its ends that at its central portion. Another inherent disadvantage of the conventional type fan is that as you increase the diameter of the fan, other things remaining equal, the ground clearance is diminished. This has several disadvantages in that the stubble of crop that has been harvested must be flattened under the fan casing and this often causes damage to the casing. Also since the air enters the fan casing through its ends the lower the fan casing sets relative to the ground the dirtier will be the air drawn into the casing.

The U.S. Pat. to Turnbull et al. No. 3,384,232 of May 21, 1968 discloses a winnowing fan for a combine harvester that differs from the above described conventional type. In the Turnbull et al. patent, a plenum chamber was located on the harvester where the fan casing is normally located. A vertical chamber was connected to the plenum chamber and air was drawn into the vertical chamber by a fan located in the upper portion thereof. In a winnowing fan of this type an evener distribution of air across the cleaning system can be provided, the plenum chamber need not be as high as the diameter of a corresponding conventional fan casing, the plenum chamber is not as susceptible to damage as is a fan casing and the air is drawn in at an elevated location where cleaner air is available. The subject invention utilizes an adjustable speed fan means that can draw air into both sides of a vertical chamber and direct it down the chamber in an efficient manner.

SUMMARY

The general purpose of this invention is to provide a winnowing fan which embraces all of the advantages of similarly employed fans and possesses none of the aforedescribed disadvantages. To attain this the present invention contemplates a vertical chamber in communication with a plenum chamber along with a unique fan means located in an elevated portion of the vertical chamber. The fan means is adjustable in speed and includes a disc having convex outer surfaces with blades protruding therefrom. The disc shape fan means is mounted within an upper portion of the vertical chamber and functions to draw air into the vertical chamber propel it downwardly through the chamber and into the plenum chamber. The plenum chamber is baffled to evenly distribute the air across the entire width of the cleaning system and is further divided into an upper and a lower branch which direct this stream of air to the chaffer and sieve respectively. The advantage of the subject invention is that because of the reduced size of the plenum chamber it can now be located such that it is no longer vulnerable to damage by stubble and other material and furthermore since there are no moving parts in the plenum chamber in is not as sensitive to dents and distortions as is a fan casing. Because of the elevated location of the air inlets a cleaner sample of air is available for the cleaning system. The baffled plenum chamber provided an evenly distributed stream of air across the entire width of the cleaning system which insures a more efficient use of the entire cleaning system. The disc-shaped fan drawing air in from both sides has sufficient capacity to efficiently supply the air requirements of high capacity cleaning system.

BRIEF DESCRIPTION OF THE DRAWING

FIG. 2 is a isolated view of the vertical chamber having a portion broken away to show the fan means;

FIG. 4 is a side view of a combine having the subject invention incorporated therein with the bottom profile of a conventional combine shown in broken lines.

DESCRIPTION OF THE PREFERRED EMBODIMENT

Figure 1:
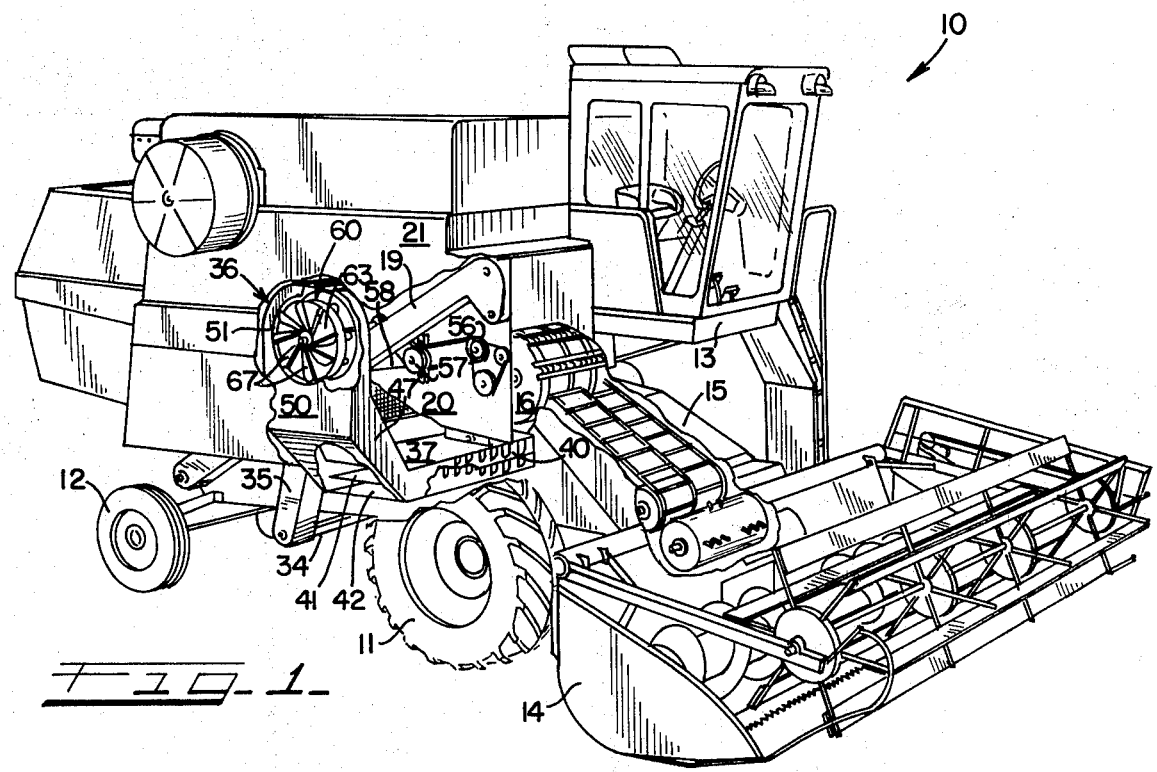
FIG. 1 is a perspective view of a combine harvester having portions broken away to show the subject invention.

Referring now to the drawings wherein like reference characters designate like or corresponding parts throughout the several views there is shown in FIGS. 1 and 4 a combine harvesting machine designated 10 having drive wheels 11, steerable wheels 12, an operator's platform 13, a platform 14 and a platform feeder 15. The thrashing separating and cleaning mechanisms are enclosed within the body portion of the combine. This enclosure includes a first vertical sidewall designated 20 and a corresponding second vertical sidewall (not shown). There is an outer shielding designated 21 spaced from the sidewalls. The thrashing mechanism includes a cylinder 16 and a beater 17. The separating mechanism includes a straw rack 18 and the cleaning system 30 includes a conventional shoe sieve 31 and chaffer 32. As can be best seen in FIG. 4 the discharge end of shoe sieve 31 overlies the tailing trough 33 in which the tailings are collected and returned through the tailings elevator 19 to the thrashing cylinders 16. Clean grain is collected in the clean grain trough 34 and conveyed through the clean grain elevator 35 to the grain tank.

The cleaning system 30 includes a winnowing fan assembly designated 36. The winnowing fan assembly 36 includes a plenum chamber 37 mounted along the lower portion of the harvesting machine and extending transverse thereto. The rear of said plenum chamber 37 being open to form a discharge area 39. The plenum chamber 37 includes a divider 40 separating it into an upper branch 41 and a lower branch 42. As can be best seen in FIG. 4 a discharge of air from the upper branch 41 is directed such that it flows through the chaffer 32. A windboard 43 including adjustable means 44 is located adjacent the discharge of the lower branch 42. The discharge of air from the lower branch is directed such that it flows through the shoe sieve 31 and its angle of inclination is controlled by adjusting the windboard 43.

Figure 3:
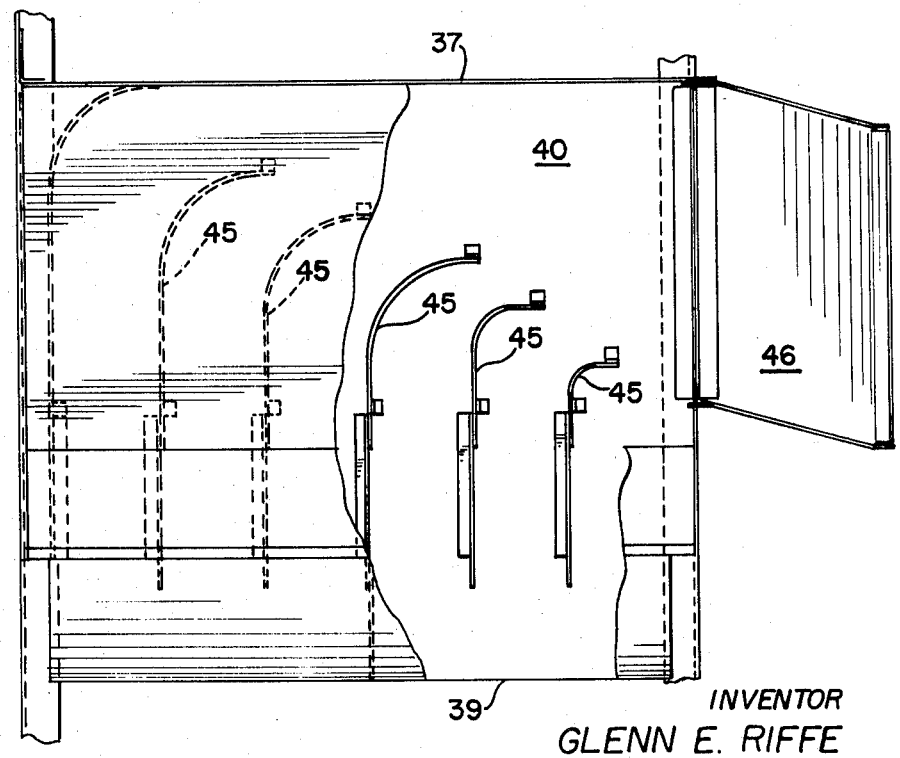
FIG. 3 is an isolated plan view of the plenum chamber having a portion broken away to show the baffles.

As can be best seen in FIG. 3 both the upper and the lower branches 41 and 42 of the plenum chamber 37 include a plurality of vanes 45 which are shaped and located to insure an even distribution of air transversly across the discharge area 39 of the plenum chamber. Air enters one side of the plenum chamber through conduit means 46 and it's direction must be changed 90° by the vanes 45. This has been accomplished by an arrangement of vanes as shown in FIG. 3 wherein the trailing edges of the vanes are equally spaced transversly of the plenum chamber.

As can be best seen in FIGS. 1 and 2 a vertical chamber 47 having a flat inner wall 48 and a flat outer wall 50 is spaced from and supported by the first vertical side wall 20 by a support 70. The flat inner wall 48 has an opening 49 formed therein and the flat outer wall 50 has an aligned opening 51 formed therein. A fan shaft 52 is rotatably supported by a journal 53 carried on the first vertical sidewall 20. The fan shaft 52 extends centrally of the openings 49 and 51. The top of the vertical chamber 47 is closed and the bottom extends inwardly where it joins the conduit means 46. A driven pulley 55 is carried by the fan shaft 52 and is connected by drive belts and a variable speed double pulley 57 to a drive pulley 56. An adjusting rod 58 controls the variable speed double pulley 57. This is a conventional type of variable speed drive and a more detailed description can be found in the U.S. Pat. to Reeves No. 2,549,637 of Apr. 17, 1951.

The fan means 60 is secured to the rotatable fan shaft 52 within the vertical chamber 47. The fan means 60 is in the form of a disc 61 having a convex outer surface 63 and a convex inner surface 64. The inner and outer surfaces are formed of conical disc connected to a central hub 62. Outer blades 67 are secured to and protrude from the convex outer surface 63. Inner blades 65 are secured to and protrude from the convex inner surface 64. The blades 67 and 65 function to pull the air into the vertical chamber 47 through the openings 49 and 51 and direct it such that it flows downwardly through the vertical chamber through the conduit means 46 and into the plenum chamber 37. The air from the plenum chamber 37 is discharged therefrom as an upper branch 41 and a lower branch 42.

A bearing support 68 supported by the outer shielding 21 supports the free end of the rotatable fan shaft 52. A screen 66 carried by the outer shielding 21 covers an opening formed in the outer shielding 21 corresponding to the opening 51 formed in the flat outer wall 50. The screen 66 functions to prevent debris from entering the vertical chamber through the opening 51 and also as a safety device.

OPERATION

The location of the air inlet openings 49 and 51 is elevated considerably from the ground level and thus the likelihood of drawing in debris with the air is diminished as compared to a conventional combine cleaning system. The rotational speed of the fan means 60 can be controlled by the combine operator through manipulation of the variable speed double pulley 57. By spacing the vertical chamber 47 away from the first vertical side wall 20 air can be drawn into the vertical chamber 47 from both sides. Since the air is somewhat restricted on the inner side the inner blades 65 protrude further than do the outer blades 67. This aspect of the fan means is designed such that equal volumes of air is handled by the outer and inner side of the fan means. The air flows down the vertical chamber 47 into the conduit means 46. The divider 40 which extends across the conduit 46 and the plenum chamber 37 divides the air into an upper branch 41 and a lower branch 42. As the air flows from the conduit 46 into the plenum chamber 37 the vanes 45 are encountered. The vanes 45 are shaped and located to insure an even distribution of air transversly across the plenum chamber. The air discharging from the plenum chamber is directed to flow through the shoe sieve 31 and the chaffer 32. The windboard 43 can be manipulated through the adjustable means 44 to change the angle of inclination of the air flowing towards the shoe sieve 31.

In FIG. 4 a broken line silhouette is shown of the bottom of a combine between the drive wheels 11 and the steerable wheels 12. In this silhouette it is seen that the fan casing is the lowest portion of a conventional combine and thus dictates the ground clearance. The height of applicant's plenum chamber is quite small compared to the diameter of a conventional fan casing and thus through the use of the subject invention the fan casing no longer determines ground clearance. As seen in FIG. 4 the grain trough 34 now determines the ground clearance of the combine. This is an important improvement because a conventional fan casing is more vulnerable to damage that is the grain trough. Through the subject invention the ground clearance of the machine has been increased and the vulnerability of the fan casing has been eliminated.

It should be understood, of course, that the foregoing disclosure relates to only a preferred embodiment of the invention and that numerous modifications or alternations may be made therein.

I claim:

1. In a harvesting machine having an enclosed body said body including:

first and second vertical sidewalls;

a cleaning system including a sieve and a chaffer for removal of chaff from grain within said enclosed body, and a winnowing fan assembly for directing a stream of air upwardly through said sieve and chaffer;

said fan assembly including a plenum chamber mounted along the lower portion of said harvesting machine within said enclosed body and extending transverse thereto, the rear of said plenum chamber being open to form a discharge area;

a vertical chamber having flat outer and inner walls, said vertical chamber supported by said harvesting machine such that its inner wall is spaced outwardly from said first vertical sidewall, aligned openings formed in said flat outer and inner walls, a rotatable fan shaft supported by said harvesting machine such that it extends into said vertical chamber through the opening formed in said flat inner wall;

fan means carried by said fan shaft within said vertical chamber, said fan means including a disc having convex outer surfaces located within said vertical chamber, blades secured to said convex surfaces and protruding therefrom such that upon rotation of said fan shaft air will be drawn into the vertical chamber through the openings formed in the flat outer and inner walls and directed down said vertical chamber;

conduit means connecting said plenum chamber to the bottom portion of said vertical chamber such that the air flowing down the vertical chamber will fill the plenum chamber and will exit through said discharge area.

2. The invention as set forth in claim 1 wherein said plenum chamber includes a plurality of vanes adapted to turn the stream of air and insure an even distribution across said discharge area.

3. The invention as set forth in claim 1 wherein said plenum chamber includes a horizontal plate dividing it into an upper level and a lower level, and wherein said discharge area includes an upper branch in communication with said upper level and a lower branch in communication with said lower level, said upper branch being inclined with respect to the horizontal such that it discharges an upwardly inclined stream of air toward said chaffer and said lower branch arranged such that it discharges a stream of air toward said sieve.

4. The invention as set forth in claim 3 wherein an adjustable windboard is provided below the stream of air discharged from said lower branch to impart a selected upward component thereto.

5. The invention as set forth in claim 2 wherein said plenum chamber includes a horizontal plate dividing it into an upper level and a lower level, and wherein said discharge area includes an upper branch in communication with said upper level and a lower branch in communication with said lower level, said upper branch being inclined with respect to the horizontal such that it discharges an upwardly inclined stream of air toward said chaffer and said lower branch arranged such that it discharges a stream of air toward said sieve.

6. The invention as set forth in claim 5 wherein an adjustable windboard is provided below the stream of air discharged from said lower branch to impart a selected upward component thereto.

7. The invention as set forth in claim 1 wherein the improvement includes variable speed drive means for said fan whereby the capacity of said fan means can be adjusted.

8. The invention as set forth in claim 1 wherein the blades on the convex surface adjacent said flat inner wall protrude further than do the blades on the convex surface adjacent said flat outer wall.

9. The invention as set forth in claim 2 wherein the improvement includes variable speed drive means for said fan whereby the capacity of said fan means can be adjusted.

10. The invention as set forth in claim 2 wherein the blades on the convex surface adjacent said flat inner wall protrude further than do the blades on said convex surface adjacent to said flat outer wall.